June 2, 1953 — I. STONE — 2,640,280

CHILD'S DRAWING DEVICE

Filed May 29, 1950

INVENTOR

*Irving Stone*

Patented June 2, 1953

2,640,280

UNITED STATES PATENT OFFICE 2,640,280

CHILD'S DRAWING DEVICE

Irving Stone, Chicago, Ill.

Application May 29, 1950, Serial No. 165,020

1 Claim. (Cl. 35—28)

My invention relates to a drawing, tracing and coloring device which may be used for educational as well as amusement purposes and the principal object thereof is directed to the provision of a novel and unique means whereby a tracing or drawing, of any subject material selected from a group of subjects provided with this device, can be reproduced and colored with various color crayons, made of wax and soap and commonly known to the trade as cellophane marking crayons, which can be removed by means of a soft cloth or cleansing tissue and the tracing, coloring and removal can be repeated as many times as is desired.

Another object of my invention is to provide a unique and novel means whereby the subject which is desired to bring into view for tracing, drawing or coloring is concealed from view until such time as it is desired to trace, draw or color same, whereby upon manipulation of the operating means associated with the device it may easily and quickly be brought into position for use.

Another object of my invention is to provide a novel means whereby a piece of transparent tissue, artist's tracing paper or the matte side of a piece of cellulose acetate sheeting or any like suitable material can be used to produce a tracing or drawing of any subject material which can be used in connection with this device.

Yet another object of my invention is to provide a means whereby a child is taught to use the proper color crayons to the end that he learns how to properly select, correlate and use the colors for the subject selected.

Various other novel features and advantages of my invention will hereinafter more fully be referred to in connection with the accompanying description of my invention, in the present preferred form thereof, reference being had to the accompanying drawing wherein.

Referring now to the drawing in detail, wherein like reference characters designate like parts, the description thereof follows.

Figure 1:
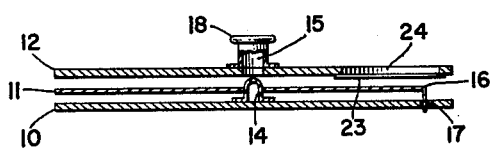
Figure 1 is a cross sectional view of the device of my invention.
Figure 2:
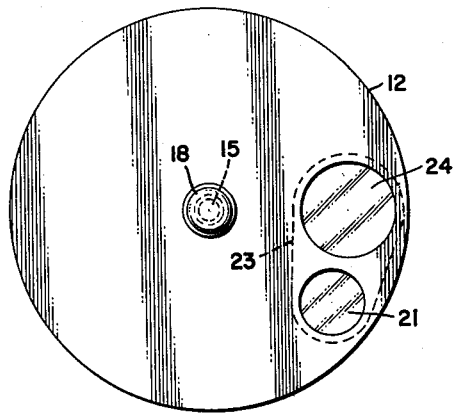
Figure 2 is a plan view of the top cover wall member of the device.
Figure 3:
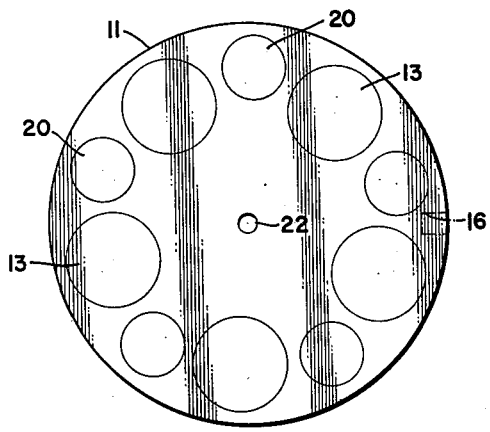
Figure 3 is a plan view of the center or intermediate disc member of the device.
Figure 4:
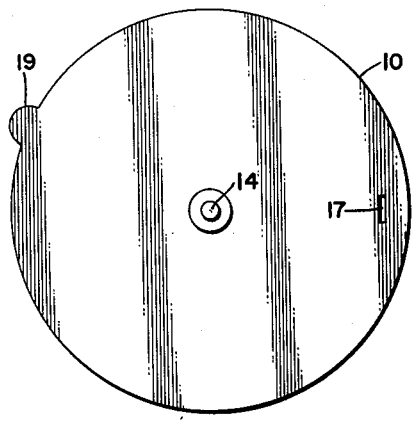
Figure 4 is a plan view of the bottom wall member of the device.

In Figure 1 I have shown a rack of cylindrical discs consisting of a bottom wall member 10, an intermediate or center disc member 11 and a top or cover wall member 12. The wall members 10 and 12 may be made of any suitable material such as paperboard, plastic or wood. The center or intermediate disc member 11, which carries the printed black and white subject matter 13 and the color guide subject matter 20 (indicated by the large and small circles respectively), is preferably made of a single or double ply white bristol board paper.

The cover wall member 12 is shown spaced away from the intermediate disc member 11 and the intermediate disc member 11 is shown spaced away from the bottom wall member 10 for the purposes hereinafter to be more fully described.

In the center of the bottom wall member 10 there is mounted and secured a male stationary shaft 14, which fits snugly into a female bearing 15, which is mounted and secured to the center of the cover wall member 12, the female bearing 15 extending somewhat above the cover wall member 12 and the top end of the bearing 15 is preferably closed and so formed 18, that it can be used as a gripper to rotate the cover wall member 12 around the male shaft 14 in order to select the subject matter, 13 and 20, desired.

The intermediate disc member 11 has a center opening 22 which fits snugly over the male shaft 14 and is prevented from turning, when the cover wall member 12 is rotated, by engaging the intermediate disc member 11 to the bottom wall member 10 by means of folding back the slit tab portion 16 (designated by dotted lines), and inserting the tab 16 into the slot 17 of the bottom wall member 10.

The bottom wall member 10 is provided with an extension tab 19, which can be used to hold the bottom wall member 10 from turning while the top cover wall member 12 is being rotated on the male shaft 14 to bring the desired printed black and white subject matter 13 and the printed color guide 20, of the same subject selected, to a position beneath the openings 21 and 24 which are provided in the cover wall member 12.

The openings 21 and 24 are covered (see dotted lines) 23, by means of attaching, with glue, to the bottom side of the top cover wall member 12 any suitable transparent material such as cellulose acetate, Vinylite, cellophane, ethyl cellulose sheeting or the like which has the property of readily accepting the markings of wax crayons, made with soap and which are commonly known to the trade as cellophane marking crayons or pencils, and which will readily permit the removal of the crayon markings by means of a soft dry cloth or cleansing tissue.

While I have described by invention in great detail and particularly with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is desired to claim and secure by Letters Patent of the United States is:

A drawing device of the class described comprising in combination, a circular bottom wall having a center shaft, a circular disc with a center opening to fit over said shaft, said circular disc having black and white pictures suitable for tracing substantially equally spaced around said disc and smaller color guide pictures identified with and spaced to one side of each corresponding respective black and white picture, said disc being provided with two short slits at right angles to its periphery to form a tab which fits into a corresponding slot of said underlying bottom wall to prevent said disc from turning, and a circular cover wall having a larger and smaller window of transparent material spaced to display said black and white and corresponding colored pictures of said underlying circular disc therethrough, said cover wall having a center bearing to fit over and turn on shaft of said bottom wall, said bearing extending somewhat above said cover wall to provide a gripper in order to rotate said top cover wall to select the desired pictures on said circular disc.

IRVING STONE.

References Cited in the file of this patent

UNITED STATES PATENTS

| Number | Name | Date |
|---|---|---|
| 1,552,406 | Akerbladh | Sept. 8, 1925 |
| 1,558,041 | Phares | Oct. 20, 1925 |
| 2,385,732 | Redding | Sept. 25, 1945 |
| 2,427,612 | Lobb | Sept. 16, 1947 |
| 2,565,557 | Guimond | Aug. 28, 1951 |